(12) United States Patent
Ayabe et al.

(10) Patent No.: US 7,544,149 B2
(45) Date of Patent: Jun. 9, 2009

(54) SHIFT CONTROL APPARATUS AND SHIFT CONTROL METHOD OF AUTOMATIC TRANSMISSION OF VEHICLE

(75) Inventors: Atsushi Ayabe, Nagoya (JP); Toshio Sugimura, Nagoya (JP); Toshinari Suzuki, Nishikamo-gun (JP); Hisashi Ishihara, Toyoake (JP); Yosuke Takaie, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 328 days.

(21) Appl. No.: 11/490,070

(22) Filed: Jul. 21, 2006

(65) Prior Publication Data
US 2007/0026996 A1 Feb. 1, 2007

(30) Foreign Application Priority Data
Aug. 1, 2005 (JP) .............................. 2005-223351

(51) Int. Cl.
*B60W 10/04* (2006.01)
*B60W 10/10* (2006.01)
(52) U.S. Cl. ........................ 477/110; 477/107; 477/109; 701/54
(58) Field of Classification Search ................. 477/107, 477/109, 110, 115; 701/51, 54
See application file for complete search history.

(56) References Cited

U.S. PATENT DOCUMENTS

| | | | |
|---|---|---|---|
| 5,882,277 A * | 3/1999 | Iizuka | 477/125 |
| 6,254,508 B1 * | 7/2001 | Kojima et al. | 477/109 |

FOREIGN PATENT DOCUMENTS

| | | |
|---|---|---|
| DE | 199 51 983 A1 | 5/2000 |
| DE | 10 2004 059 414 A1 | 7/2005 |
| JP | 5-180319 | 7/1993 |
| JP | 8-244499 | 9/1996 |
| JP | 9-291835 | 11/1997 |
| JP | 2001-124193 | 5/2001 |
| JP | 2002-30951 | 1/2002 |
| JP | 2002-168332 | 6/2002 |
| JP | 2005-48781 | 2/2005 |
| KR | 2002-0046735 | 6/2002 |
| KR | 03-0354037 | 9/2002 |
| KR | 10-2004-0020027 | 3/2004 |
| KR | 10-0579259 | 5/2006 |

* cited by examiner

*Primary Examiner*—David D. Le
(74) *Attorney, Agent, or Firm*—Oblon, Spivak, McClelland, Maier & Neustadt, P.C.

(57) ABSTRACT

The invention relates to a shift control apparatus for an automatic transmission that executes a torque reduction control when the transmission downshifts in response to a downshift determination made during an upshift. The shift control apparatus includes a multiple shift execution unit that starts the downshift in response to the downshift determination, and a torque reduction control execution unit that determines whether the rotational speed of the input member is at least a control start-up rotational speed, after the downshift operation starts, and executes a torque reduction control of the power source when the rotational speed of the input member is increased to at least the control start-up rotational speed. This allows the rotational speed of the input shaft to be quickly changed to the appropriate synchronous rotational speed. Thus, the desired driving force is provided upon completion of the downshift without overspeeding the engine.

16 Claims, 10 Drawing Sheets

FIG.2

| PORTION | | CLUTCH & BRAKE | | | | | | | O.W.C | |
|---|---|---|---|---|---|---|---|---|---|---|
| | | C1 | C0 | C2 | B1 | B2 | C3 | B3 | F1 | F2 |
| N, P | | × | × | × | × | × | × | O | × | × |
| R | | × | × | O | × | O | × | O | × | × |
| D | 1st | O | × | × | × | × | × | O | O | △ |
| | 2nd | O | × | × | O | × | × | O | × | △ |
| | 3rd | O | O | × | × | × | × | O | × | △ |
| | 4th | × | O | × | O | × | × | O | × | △ |
| | 5th | × | O | × | O | × | O | × | × | × |
| 1st ENGINE BRAKE | | O | × | × | × | O | × | O | △ | △ |

US 7,544,149 B2

SHIFT CONTROL APPARATUS AND SHIFT CONTROL METHOD OF AUTOMATIC TRANSMISSION OF VEHICLE

INCORPORATION BY REFERENCE

The disclosure of Japanese Patent Application No. 2005-223351, filed on Aug. 1, 2005, including the specification, drawings and abstract, is incorporated herein by reference in its entirety.

BACKGROUND OF THE INVENTION

1. Field of the Invention

The invention relates to a shift control apparatus and shift control method for an automatic transmission, which executes a torque reduction control when downshifting in response to a downshift determination made during an upshift.

2. Description of Related Art

In Japanese Patent Publication Laid-Open No. 2001-124193 a shift control of an automatic transmission for changing the speed of a rotation transferred from a power source to an input member, and outputs the rotation to a drive wheel, is described. During an upshift, in which a first friction coupling device is engaged, the operation of the accelerator by the driver may cause a downshift command to be output. When the transmission downshifts, the first friction-coupling device is disengaged and a second friction-coupling device is engaged. Accordingly, the engine may overspeed, and the downshift cannot be performed appropriately. The described shift control addresses this problem by delaying the downshift, in spite of the downshift command, for a predetermined time. In addition, Japanese Patent Publication Laid-Open No. 8-244499 describes the technology for starting the downshift in response to the downshift determination, and executing a torque reduction control for reducing the torque of the power source during the downshift so as to prevent overspeeding of the engine and to decrease the shift shock.

In Japanese Patent Publication Laid-Open No. 2001-124193, because the downshift is delayed, there is a lag between the operation of the accelerator pedal and output of the desired driving force through the downshift operation. Meanwhile, in Japanese Patent Publication Laid-Open No. 8-244499, the downshift operation starts immediately in response to the downshift command and the torque reduction control is executed simultaneously. The downshift operation is then performed under the condition where the torque of the power source is suppressed. Accordingly, much time is taken for the rotational speed of the input member to increase to the synchronous rotational speed of a gear stage after the downshift operation. Again resulting in a time lag between operation of the accelerator pedal and output of the desired driving force.

SUMMARY OF THE INVENTION

It is an object of the invention to provide a shift control apparatus and shift control method for an automatic transmission that executes a torque reduction control when performing the downshift, in response to the downshift determination made during the upshift operation, for changing the rotational speed of the input member to a synchronous rotational speed quickly while preventing overspeeding of the engine. The desired driving force may be obtained quickly upon completion of the downshift.

An aspect of the invention relates to a shift control apparatus that executes a shift control of an automatic transmission that changes a speed of a rotation transferred from a power source to an input member and outputs the rotation to a drive wheel. In response to a downshift determination made during an upshift, in which a first friction coupling device is engaged, the shift control apparatus performs a downshift, whereby the first friction coupling device is disengaged and a second friction coupling device is engaged. The shift control apparatus is provided with (a) a multiple shift execution unit that starts the downshift operation in response to the downshift determination, and (b) a torque reduction control execution unit that determines, after starting the downshift operation, whether a rotational speed of the input member has increased to at least a control start-up rotational speed, which is preliminarily set to be lower than a synchronous rotational speed, and executes a torque reduction control to reduce the torque output of the power source when the rotational speed of the input member is increased to at least the control start-up rotational speed. The synchronous rotational speed is determined in accordance with a shift ratio of a gear stage to be established by the downshift operation.

In the shift control apparatus, (a) the power source may comprise an internal combustion engine with an electronically controlled throttle valve, and (b) the torque reduction control execution unit may execute a control to reduce the opening degree of the throttle valve so that the engine outputs only sufficient torque to increase the rotational speed of the input member to the synchronous rotational speed.

In the shift control apparatus, the torque reduction control execution unit may end the torque reduction control after the rotational speed of the input member has exceeded a predetermined return rotational speed, which is higher than the synchronous rotational speed, and then decreased to be equal to or lower than the return rotational speed.

In the shift control apparatus, the torque reduction control execution unit may include a rotational speed change determination unit that determines whether the rotational speed of the input member is increasing or decreasing during the downshift operation based on the difference between the rotational speed of the input member at the start of the downshift operation and the synchronous rotational speed. The manner in which torque reduction control is executed will depend on the above-described determination result.

In the shift control apparatus, when the rotational speed of the input member at the start of the downshift operation is lower than a control switch rotational speed that is set based on the synchronous rotational speed, the rotational speed change determination unit may determine that the rotational speed is increasing, and when the rotational speed of the input member is equal to or higher than the control switch rotational speed, the rotational speed change determination unit may determine that the rotational speed is decreasing.

In the shift control apparatus, the multiple shift execution unit may execute the torque reduction control when the rotational speed of the input member has increased to at least the control start-up rotational speed when the rotational speed change determination unit determines that the rotational speed is increasing, and execute the torque reduction control immediately after the downshift starts when the rotational speed change determination unit determines that the rotational speed is decreasing.

In the shift control apparatus, (a) the power source may comprise the internal combustion engine with an electronically controlled throttle valve, and (b) the torque reduction control execution unit, which executes a control to reduce the opening degree of the throttle valve so that the engine outputs only sufficient torque to increase the rotational speed of the input member to the synchronous rotational speed when the rotational speed change determination unit determines that the rotational speed is increasing, and executes a control to fully close the throttle valve opening degree when the rotational speed change determination unit determines that the rotational speed is decreasing.

In the shift control apparatus, the torque reduction control execution unit may end the torque reduction control when the rotational speed of the input member has exceeded a predetermined first return rotational speed, which is higher than the synchronous rotational speed, and then decreases to be equal to or lower than the first return rotational speed when the rotational speed change determination unit determines that the rotational speed is increasing, and end the torque reduction control when the rotational speed of the input member decreases to be equal to or lower than a predetermined second return rotational speed, which is higher than the synchronous rotational speed, when the rotational speed change determination unit determines that the rotational speed is decreasing.

According to the aspect of the shift control apparatus as described above, a downshift is started in response to the downshift determination while keeping the torque reduction control in a stand-by state until the rotational speed of the input member is increased to at least the control start-up rotational speed, which is lower than the synchronous rotational speed. The torque of the power source allows the rotational speed of the input member to be increased quickly to reach the control start-up rotational speed such that the torque reduction control starts. This makes it possible to obtain the desired driving force by performing the downshift quickly while preventing overspeeding of the engine.

According to the aspect of the invention, the power source may be an internal combustion engine in which the throttle valve is controlled to reduce the throttle valve opening degree so that the engine outputs only sufficient torque to increase the rotational speed of the input member to the synchronous rotational speed. This allows the engine torque to increase the rotational speed of the input member to the synchronous rotational speed more quickly while preventing overspeeding of the engine, resulting in excellent shift response.

According to the aspect of the invention, the torque reduction control ends when the rotational speed of the input member exceeds the return rotational speed, which is higher than the synchronous rotational speed, and then decreases to be equal to or lower than the return rotational speed. This makes it possible to start generating the torque quickly upon completion of the downshift while preventing the overspeeding of the engine caused by ending the torque reduction control.

According to the aspect of the invention, it is determined whether the rotational speed of the input member during the downshift operation is increasing or is decreasing. The torque reduction control is executed differently depending on whether it is determined that the rotational speed of the input member is increasing or is decreasing. In the case where the downshift determination is made during the upshift that skips at least one gear stage, and the downshift to the skipped intermediate gear stage is started, the torque reduction control may always be executed appropriately irrespective of whether the rotational speed of the input member is increasing or is decreasing. This makes it possible to improve the shift response while preventing the overspeeding of the engine, thus quickly obtaining the desired driving force.

According to the aspect of the invention, when the rotational speed of the input member at the start of the downshift is lower than the control switch rotational speed that is set based on the synchronous rotational speed, it is determined that the rotational speed is increasing. Meanwhile, when it is equal to or higher than the control switch rotational speed, it is determined that the rotational speed is decreasing. This makes it possible to determine with respect to the trend of the change in the rotational speed of the input member easily and quickly.

According to the aspect of the invention, when the rotational speed change determination unit determines that the rotational speed is increasing, the torque reduction control is executed when the rotational speed of the input member increases to at least the control start-up rotational speed. On the other hand, when the rotational speed change determination unit determines that the rotational speed is decreasing, the torque reduction control is immediately executed. This makes it possible to consistently execute the torque reduction control appropriately, irrespective of the difference in the rotational speed change of the rotational speed of the input member. The desired driving force, thus, may be obtained quickly by improving the shift response while preventing the overspeeding of the engine.

According to the aspect of the invention, the power source may be an internal combustion engine. When the rotational speed change determination unit determines that the rotational speed is increasing, a control is executed to reduce the opening degree of the throttle valve so that the engine only outputs sufficient torque to increase the rotational speed of the input member to the synchronous rotational speed. On the other hand, when it is determined that the rotational speed is decreasing, a control is executed to fully close the opening degree of the throttle valve. This makes it possible to always execute the appropriate torque reduction control irrespective of the difference in the rotational speed change of the rotational speed of the input member. The desired driving force, thus, may be obtained by improving the shift response while preventing the overspeeding of the engine.

According to the aspect of the invention, in the case where the rotational speed change determination unit determines that the rotational speed is increasing, the torque reduction control ends after the rotational speed of the input member exceeds the first return rotational speed, which is higher than the synchronous rotational speed, and then decreases to be equal to or lower than the first return rotational speed. In the case where the rotational speed change determination unit determines that the rotational speed is decreasing, the torque reduction control ends when the rotational speed of the input member decreases to be equal to or lower than the second return rotational speed, which is higher than the synchronous rotational speed. This makes it possible to start generating the torque upon completion of the downshift irrespective of the difference in the rotational speed change of the rotational speed of the input member while preventing overspeeding of the engine that may otherwise be caused by ending the torque reduction control.

The invention may be applied to an automatic transmission of planetary gear type in which a plurality of gear stages are established in accordance with the operation states of a plurality of clutches and brakes. Likewise, it may also be applied to a staged parallel axes type automatic transmission which will be brought into a neutral state owing to the delay in engagement of the second friction coupling device when switching from the upshift operation to the downshift operation.

The input member of the automatic transmission may be the turbine shaft of a torque converter when the power is transferred from the engine via the torque converter, and may be the motor shaft of an electric motor when the power is transferred from an electric motor. The power source may be an engine, an electric motor, or the like.

Preferably, the first and the second friction coupling devices are of the hydraulic type such that, for example, the engagement pressure is changed in accordance with a predetermined change pattern under the hydraulic control by operating the solenoid valve or by operation of the accumulator, for example. However, other friction coupling devices, such as those of the electromagnetic type may be used. The friction coupling devices as described above may include, but are not limited to, single plate clutches, multiplate clutches, brakes, belt type brakes, and the like.

The invention may be applied where, when a downshift is executed in response to a downshift determination made during an upshift that skips at least one gear stage and engages a first friction coupling device, the rotational speed of the input member, which, at the start of the downshift, is lower than the synchronous rotating speed of the gear stage after the downshift, is increased, so as to establish the downshift. However, the invention may also be applied where the downshift, which disengages the first friction coupling device and engages a second friction-coupling device, to the gear stage one step lower, which is established during the upshift that engages the first friction coupling device and disengages the second friction coupling device.

Initially, an upshift determination may be made when, for example, the accelerator pedal in an OFF state (requiring no output), in accordance with the shift map and the upshift is performed. Then, if the accelerator pedal is set to ON (requiring power) during the upshift, the downshift determination may be made in accordance with the shift map. The invention may also be applied to the case where the downshift determination is made during the upshift in accordance with the downshift command through the shift lever operation.

In the aspect of the invention, the multiple shift execution unit is structured to start the downshift, during the upshift that skips at least one gear stage, to the skipped intermediate gear stage in response to the downshift determination. The invention is applicable to the any shift in which the rotational speed of the power source exceeds the synchronous rotational speed due to overspeeding of the power source during the upshift even in the multiple shift of upshifts or downshifts to the next higher or lower stage, respectively.

The determination as to whether the rotational speed of the input member is increasing or decreasing may be made in accordance with the relationship between the rotational speed of the input member at the start of the downshift operation and the synchronous rotational speed after the downshift has been completed (i.e. the rotational speed when a required gear stage is established). In particular, a control switch rotational speed is calculated by adding a predetermined value to the synchronous rotational speed. The predetermined value is determined based on factors such as, for example, the response delay of the power source torque, response delay of the shift control, inertia of the power source (rotational speed), the downshift pattern, and the like. The resultant control switch rotational speed is then compared with the rotational speed of the input member. The predetermined value may be set to a constant value for each downshift patterns. It may also be derived from an equation or data map in which parameters, such as, for example, or the rotational speed of the power source and the oil temperature at the start of the downshift and the like, are set. The predetermined value may be either a positive or negative value.

The control start-up rotational speed, the return rotational speed, and the first and the second return rotational speeds may be set to the values each obtained by subtracting or adding the predetermined value from or to each of the synchronous rotational speeds. Alternatively it may be obtained by subtracting or adding the predetermined value calculated from the equation or data map in which parameters such as, for example, the downshift pattern, or the rotational speed of the power source and the oil temperature at the start of the downshift and the like, are set.

In the aspect of the invention, the throttle valve opening degree may be preliminarily set to a predetermined value that allows the engine to output the torque to increase the rotational speed of the input member to the synchronous rotational speed. The throttle valve opening degree may be calculated from the equation or the data map in which parameters such as, for example, the downshift pattern, or the oil temperature and the like, are set. In the aspect of the invention, the engine is employed as the power source. In the case where the electric motor is employed as the power source, it may be structured to control the electric motor torque such that the rotational speed of the input member is increased by the electric motor to the synchronous rotational speed.

In the aspect of the invention, it is preferable to set the first and the second return rotational speeds to different values in accordance with different torque reduction controls. However, they may be set to the same value.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a graph that shows engagement and disengagement states of clutches and brakes for establishing the respective gear stages of the automatic transmission as shown in FIG. 1;

DETAILED DESCRIPTION OF THE INVENTION

Figure 1:
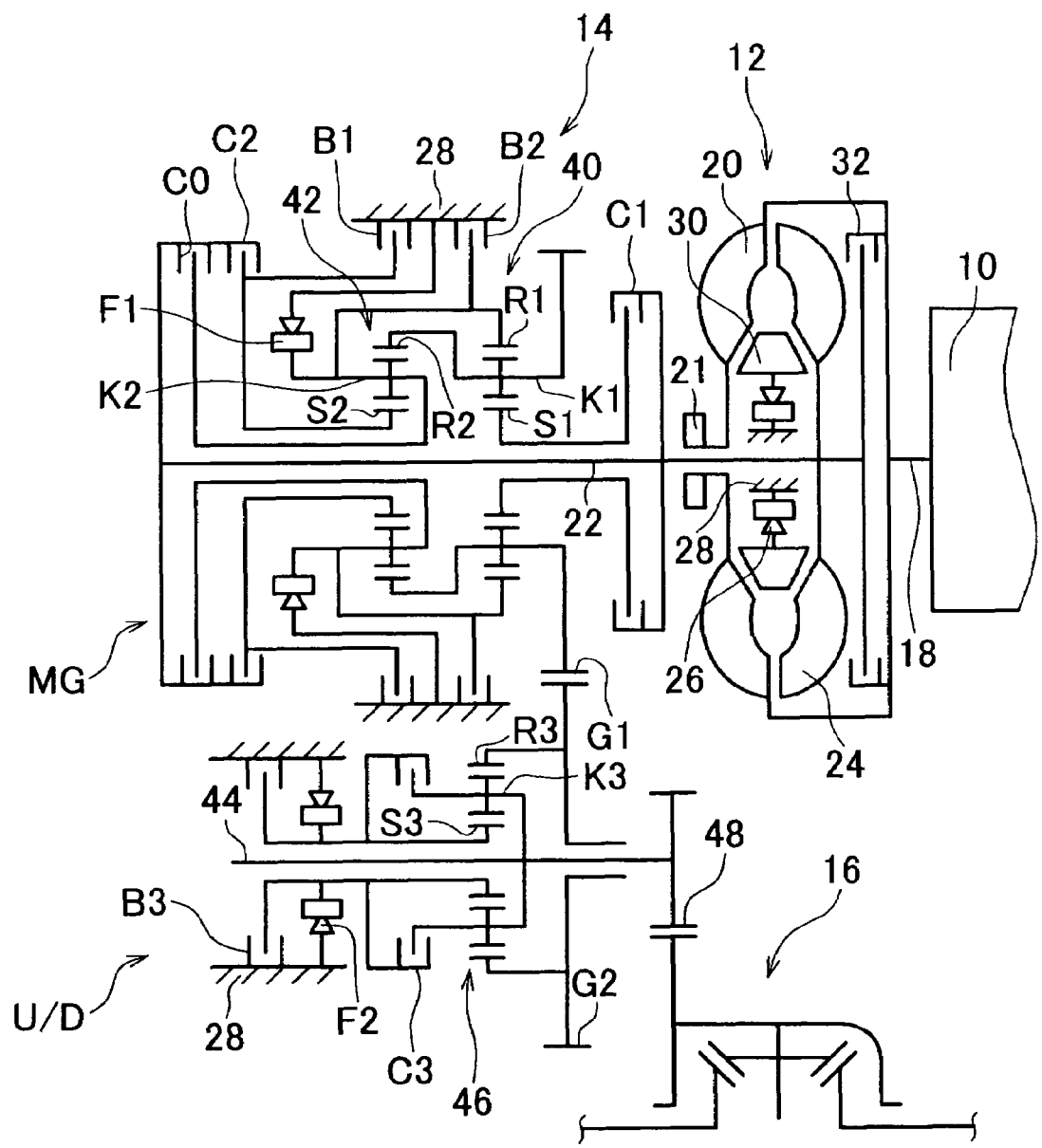
FIG. 1 is a schematic view of a structure of a vehicular drive unit to which the invention is applied.

An embodiment of the invention will be described referring to the drawings.

FIG. 1 shows an outline of a drive unit for an FF (Front engine, Front drive) vehicle in which the engine is transversely mounted. The output of the internal combustion engine 10, such as a gasoline engine, is transferred to the front wheels (not shown) via power transmission units including a torque converter 12, an automatic transmission 14, and a differential gear unit 16. The torque converter 12 is provided with a pump blade 20 connected to the crank shaft 18 of the engine 10, a turbine blade 24 connected to the input shaft 22 of the automatic transmission 14, a stator 30 that is fixed to a housing 28 as a non-rotating member via a one-way clutch 26, and a lock-up clutch 32 that directly connects the crank shaft 18 to the input shaft 22 via a damper (not shown). The pump blade 20 is connected to a mechanical oil pump 21, such as a gear pump, which is driven by the engine 10 to rotate together with the pump blade 20 to generate the hydraulic pressure for a shift operation or lubrication. The engine 10 is employed as the power source for driving the vehicle, the torque converter 12 is employed as a fluid coupling, and the input shaft 22 is employed as the input member.

The automatic transmission 14 is provided with a first single pinion type planetary gear unit 40 and a second single pinion type planetary gear unit 42 coaxially provided on the input shaft 22 to form a planetary gear mechanism with CR-CR coupling in which the carrier and the ring gear are connected to each other, a third planetary gear unit 46 provided on a counter shaft 44 that is coaxially parallel to the input shaft 22, and an output gear 48, fixed to an end of the counter shaft 44, that is in mesh with the differential gear unit 16. The carriers that rotatably support the elements that constitute the planetary gear units 40, 42, and 46, that is, the sun gear, ring gear and planetary gear in mesh therewith, are selectively connected by four clutches C0, C1, C2, and C3, or selectively connected to the housing 28 as the non-rotating member by three brakes B1, B2, and B3. The carriers are also engageable or with the housing 28 in the direction of the rotation by one-way clutches F1 and F2. Because the upper and lower sections of the differential gear unit 16 are symmetrical about the axis of the axle, the lower section is not shown in FIG. 1.

The pair of the first and the second planetary gear units 40, 42 provided coaxially on the input shaft 22, the clutches C0, C1, C2, the brakes B1, B2, and the one-way clutch F1 constitute a main shift unit MG with four forward gear stages and a one reverse stage. An overdrive unit O/D, that is, a sub shift unit is formed of the planetary gear unit 46 provided on the counter shaft 44, the clutch C3, the brake B3, and the one-way clutch F2. In the main shift unit MG, the input shaft 22 is connected to the carrier K2 of the second planetary gear unit 42, the sun gears S1, S2 of the first and the second planetary gear units 40 and 42, respectively via the clutches C0, C1 and C2. The portion between the ring gear R1 of the first planetary gear unit 40 and the carrier K2 of the second planetary gear unit 42 is connected to the portion between the ring gear R2 of the second planetary gear unit 42 and the carrier K1 of the first planetary gear unit 40. The sun gear S2 of the second planetary gear unit 42 and the ring gear R1 of the first planetary gear unit 40 are connected to the housing 28 as the non-rotating member via the brakes B1 and B2, respectively. The one-way clutch F1 is provided between the carrier K2 of the second planetary gear unit 40 and the housing 28 as the non-rotating member. The first counter gear G1 fixed to the carrier K1 of the first planetary gear unit 40 is in mesh with the second counter gear fixed to the ring gear R3 of the third planetary gear unit 46 with each other. In the over drive unit O/D, the carrier K3 and the sun gear S3 of the third planetary gear unit 46 are connected with each other via the clutch C3. Accordingly the brake B3 and the one-way clutch F2 are provided in parallel between the sun gear S3 and the housing 28 as the non-rotating member.

Figure 3:
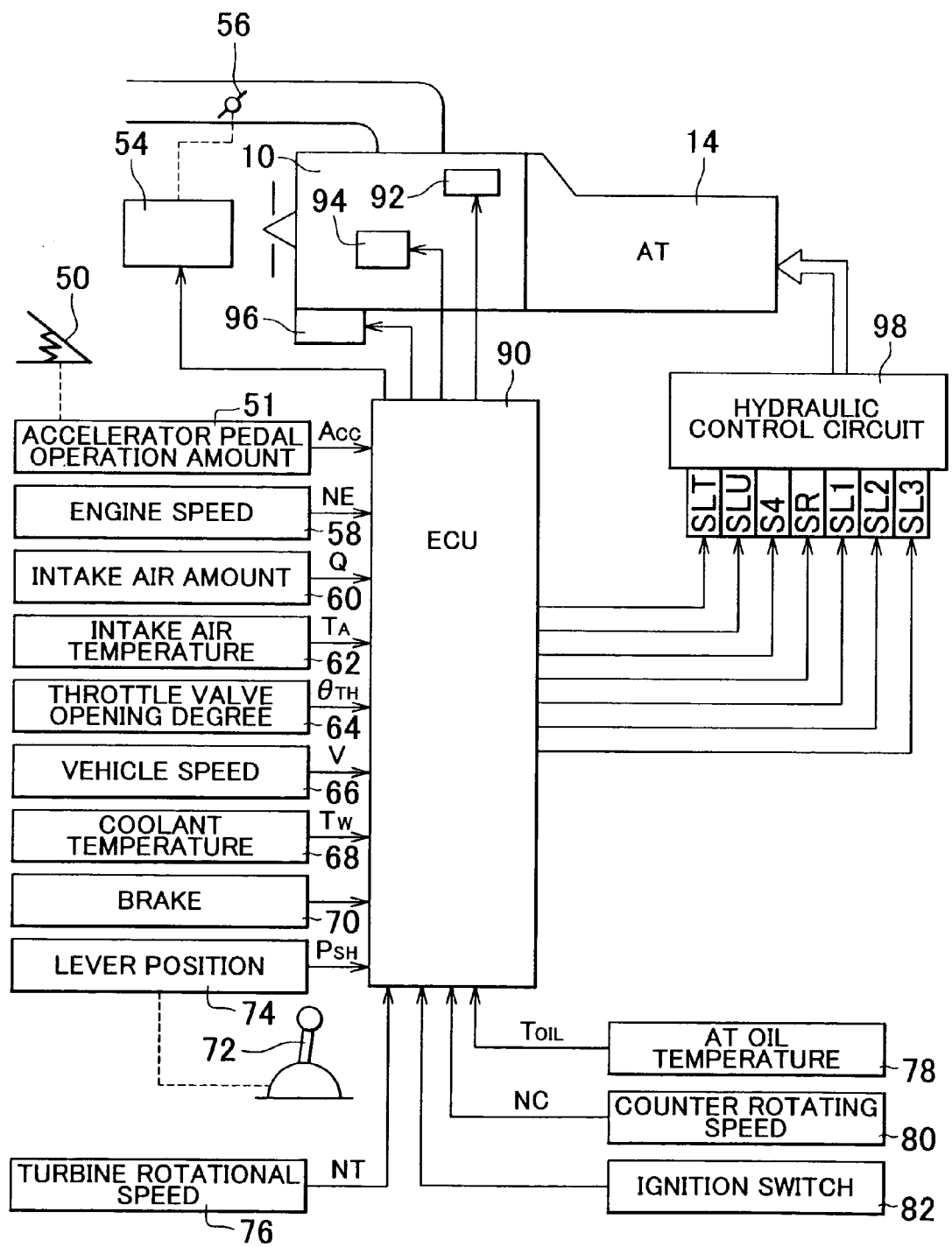
FIG. 3 is a view showing input/output signals processed by an electronic control unit provided for a vehicle according to the embodiment of the invention as shown in FIG. 1.
Figure 4:
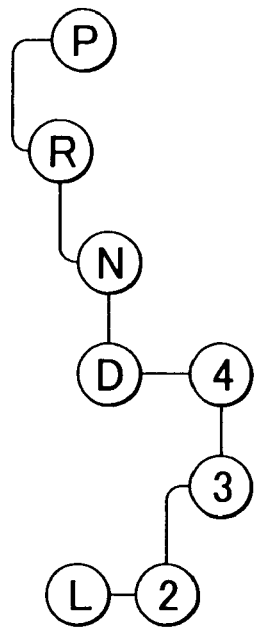
FIG. 4 is a view that shows an example of a shift pattern performed by a shift lever shown in FIG. 3.

The clutches C0, C1, C2, and C3 and the brakes B1, B2, and B3 (hereinafter generally referred to as the clutch C and the brake B when no distinction among between particular clutches or brakes is required) are hydraulic friction coupling devices that are engaged or disengaged by a hydraulic actuator, for example, the multiple clutch and the band brake. The hydraulic circuit is switched between the engaged state and the disengaged state as shown in FIG. 2 by supplying/not supplying electricity to solenoid valves S4, SR of a hydraulic control circuit 98 (FIG. 3), or the linear solenoid valves SL1, SL2, SL3, SLT, SLU, and the like, or by operating a manual valve (not shown). In the hydraulic friction-coupling device, each of five forward stages, one reverse stage, and one neutral stage is established in accordance with the operating position of a shift lever 72 (FIG. 3). Referring to FIG. 2, the terms "1st" to "5th" represent the 1st to the 5th forward stages, "O" represents the engaged state, "X" represents the disengaged state, and "?" represents the engaged state only in the driving state. The shift lever 72 may be switched to the respective positions in accordance with a shift pattern shown in FIG. 4, for example including a parking position "P", a reverse position "R", a neutral position "N", and forward drive positions "D", "4", "3", "2", and "L". When the shift lever 72 is set at the positions "P" and "N", the neutral stage is established as the non-drive gear stage for interrupting the power transmission. At the position "P", the drive wheels are mechanically prevented from rotating by a mechanical parking mechanism. The five forward stages and the reverse stage, established at the forward position "D", or the reverse position "R", respectively correspond to the drive gear stages.

FIG. 3 is a block diagram that shows control systems provided in the vehicle for controlling the engine 10 and the automatic transmission 14 as shown in FIG. 1. In the control system, an operation amount of an accelerator pedal 50 (opening degree of the accelerator), that is, Acc is detected by an accelerator pedal operation amount sensor 51. The accelerator pedal 50 is depressed by a vehicle operator in accordance with an output amount required by the vehicle operator. The accelerator pedal 50 corresponds to the accelerator operation member, and the accelerator operation amount Acc corresponds to a required output amount. An intake pipe of the engine 10 is provided with an electronic throttle valve 56 having its opening degree $\theta_{TH}$ changed by a throttle actuator 54. Further provided are an engine speed sensor 58 for detecting the engine speed NE of the engine 10, an intake air amount sensor 60 for detecting the intake air amount Q of the engine 10, an intake air temperature sensor 62 for detecting the temperature $T_A$ of the intake air, a throttle sensor 64 with an idle switch for detecting the fully closed (idling) state of the electronic throttle valve 56 and its opening degree $\theta_{TH}$, a vehicle speed sensor 66 for detecting the rotational speed $N_{OUT}$ (corresponding to the rotational speed of the output shaft) of the counter shaft 44, which corresponds to the vehicle speed V, a coolant temperature sensor 68 for detecting the coolant temperature Tw of the engine 10, a brake switch 70 for detecting whether or not the foot brake has been operated, a lever position sensor 74 for detecting the lever position (operating position) $P_{SH}$ of the shift lever 72, a turbine rotational speed sensor 76 for detecting a turbine rotational speed NT, an AT oil temperature sensor 78 for detecting the AT oil temperature $T_{OIL}$ as the temperature of work fluid within a hydraulic control circuit 98, a counter rotational speed sensor 80 for detecting a rotational speed NC of the first counter gear G1, and an ignition switch 82, respectively. The aforementioned sensors output signals representing the engine speed NE, intake air amount Q, intake air temperature TA, throttle valve opening degree $\theta_{TH}$, vehicle speed V (rotational speed of output shaft $N_{OUT}$), engine coolant temperature Tw, presence or absence of the braking operation, lever position $P_{SH}$ of the shift lever 72, the turbine rotational speed NT, AT oil temperature $T_{OIL}$, the counter rotational speed NC, and the operating position of the ignition switch 82 so as to be supplied to an electronic control unit 90. The turbine rotational speed NT is equivalent to the rotational speed of the input shaft 22 as the input member (input shaft rotational speed $N_{IN}$).

Figure 5:
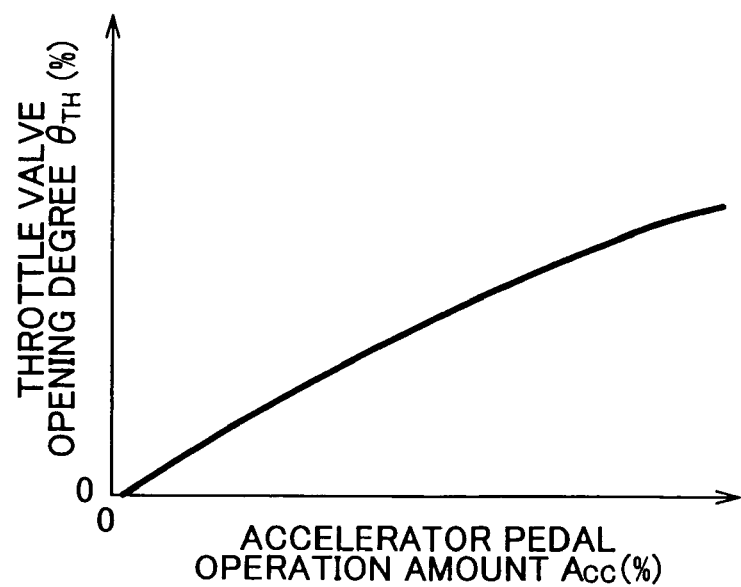
FIG. 5 is a graph showing an exemplary relationship between an accelerator pedal operation amount Acc used for the throttle control executed by the electronic control unit shown in FIG. 3 and the throttle valve opening degree $\theta_{TH}$.

The electronic control unit 90 includes a microcomputer provided with a CPU, a RAM, a ROM, an I/O interface and the like. The CPU processes signals in accordance with the program preliminarily stored in the ROM while using a temporary data storage function of the RAM to execute output control of the engine 10 or the shift control of the automatic transmission 14. The CPU may be divided into sections for controlling the engine and the shifting if needed. Under the output control of the engine 10, switching control of the electronic throttle valve 56 is executed by the throttle actuator 54, a fuel injection valve 92 is controlled for a fuel injection amount control, and an ignition unit 94, such as an igniter, is controlled for controlling an ignition timing. Under the control of the electronic throttle valve 56, the throttle actuator 54 is driven based on the actual accelerator pedal operation amount Acc derived from the relationship shown in FIG. 5, for example to increase the throttle valve opening degree $\theta_{TH}$ as the accelerator pedal operation amount Acc increases. Upon start-up of the engine 10, the crankshaft 18 is cranked by a starter 96 (e.g., electric motor).

Figure 6:
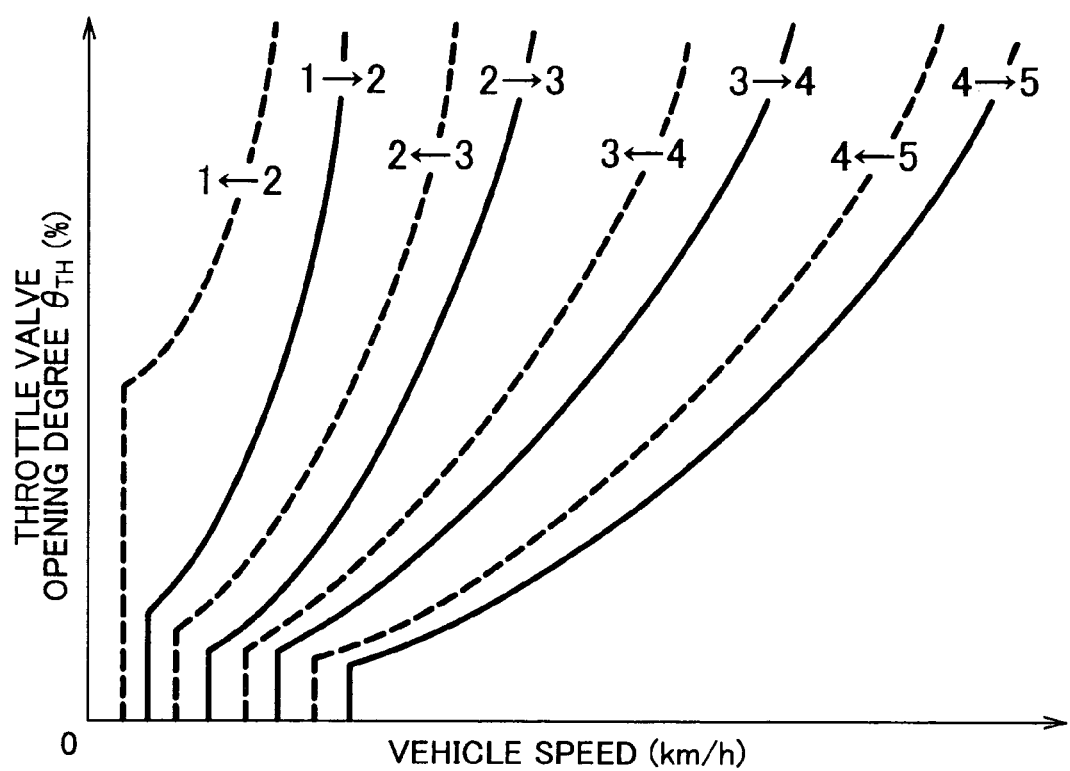
FIG. 6 is a graph showing an exemplary shift chart (map) used for the shift control of the automatic transmission executed by the electronic control unit shown in FIG. 3.

Under the shift control of the automatic transmission 14, the gear stage to be shifted therein is determined based on the actual throttle valve opening degree $\theta_{TH}$ and the vehicle speed V derived from a shift graph (shift map) preliminarily stored as shown in FIG. 6, for example, that is, the shift determination, from the present stage to the one to be shifted, is made. Executed are shifting output for starting the shifting operation from the present gear stage to the determined gear stage, the switching operation with respect to the solenoid valves S4, SR of the hydraulic control circuit 98 between ON (electricity is applied) and OFF (electricity not applied), and continuous change of the electricity application state of the linear solenoid valves SL1, SL2, SL3, SLT, and SLU. The solid line and broken line of the graph shown in FIG. 6 represent the upshift operation and the downshift operation, respectively. As the vehicle speed V decreases, and the throttle valve opening degree $\theta_{TH}$ increases, the next lower gear stage with a greater gear ratio is selected (=rotational speed of the input shaft $N_{IN}$/rotational speed of the output shaft $N_{OUT}$). The numbers "1" to "5" correspond to the "1st" to "5th" stages, respectively.

Figure 7:
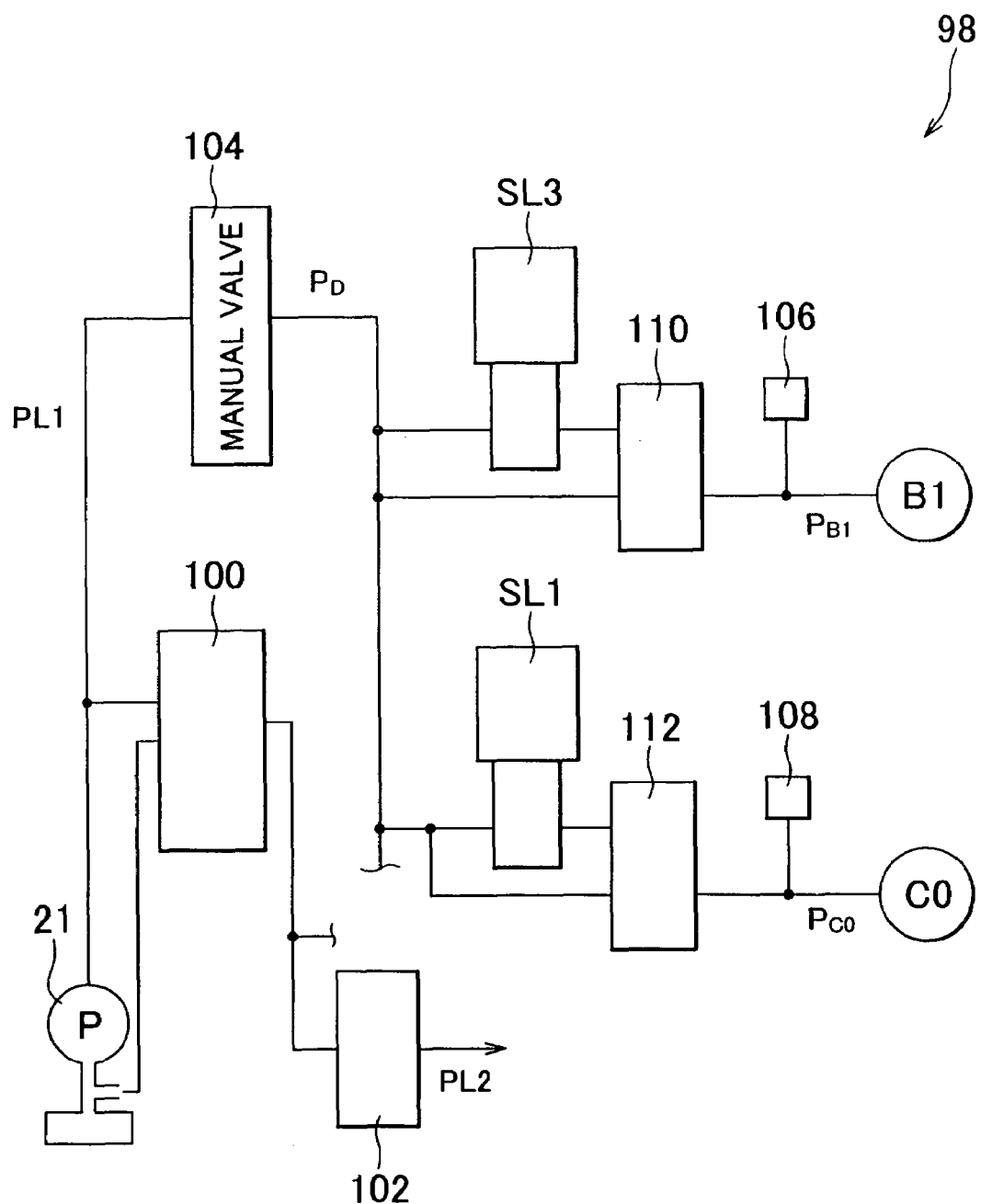
FIG. 7 is a circuit diagram of the hydraulic control circuit shown in FIG. 3 with respect to the section that relates to the brake B1 and the clutch C0 which are brought into engagement and disengagement, respectively during the 3rd to 2nd downshift in response to the 3rd to 2nd downshift determination made in the course of the 1st to 3rd upshift operation.

FIG. 7 shows an essential portion of the hydraulic control circuit 98 which relates to the state where the 3rd to 2nd downshift determination is made during the 1st to 3rd upshift operation as one of the multiple shifting, and the 3rd to 2nd downshift is performed. More specifically, FIG. 7 represents the hydraulic circuit which relates to the clutch C0 engaged during the 1st to 3rd upshift, and disengaged upon the 3rd to 2nd downshift, and the brake B1 engaged upon the 3rd to 2nd downshift. In the embodiment, the clutch C0 corresponds to the first friction coupling device, and the brake B1 corresponds to the second friction coupling device.

Referring to FIG. 7, the work fluid is pressurized by an oil pump 21 and the pressure is regulated to a first line pressure PL1 by a first pressure relief valve 100. The pressure of the work fluid flowing from the first pressure relief valve 100 is adjusted to a second line pressure PL2 by a second pressure relief valve 102. The first pressure relief valve 100 serves to regulate the first line pressure PL1 in accordance with the turbine torque $T_T$, that is, the input torque $T_{IN}$ of the automatic transmission 14 or the throttle valve opening degree $\theta_{TH}$ as the substitute value. The first line pressure PL1 is supplied to a manual valve 104 interlocked with the shift lever 72. When the shift lever 72 is operated at the position D, the manual valve 104 supplies the forward position pressure $P_D$ equivalent to the first line pressure PL1 to the solenoid valves including the linear solenoid valves SL1, SL2, and SL3, the shift valve, the control valve, and the like. In conjunction with the brake B1 and the clutch C0, FIG. 7 shows the linear solenoid valve SL3 that directly controls the engagement pressure $P_{B1}$ of the brake B1, the linear solenoid valve SL1 that directly controls the engagement pressure $P_{C0}$ of the clutch C0, a hydraulic sensor 106 connected to the brake B1 for detecting the engagement pressure $P_{B1}$, a hydraulic sensor 108 connected to the clutch C0 for detecting the engagement pressure $P_{C0}$, a $P_{B1}$ control valve 110 and a $P_{C0}$ control valve 112 for regulating engagement pressures $P_{B1}$ and $P_{C0}$ in accordance with the hydraulic signals supplied from the linear solenoid valves SL3 and SL1, respectively.

Figure 8:
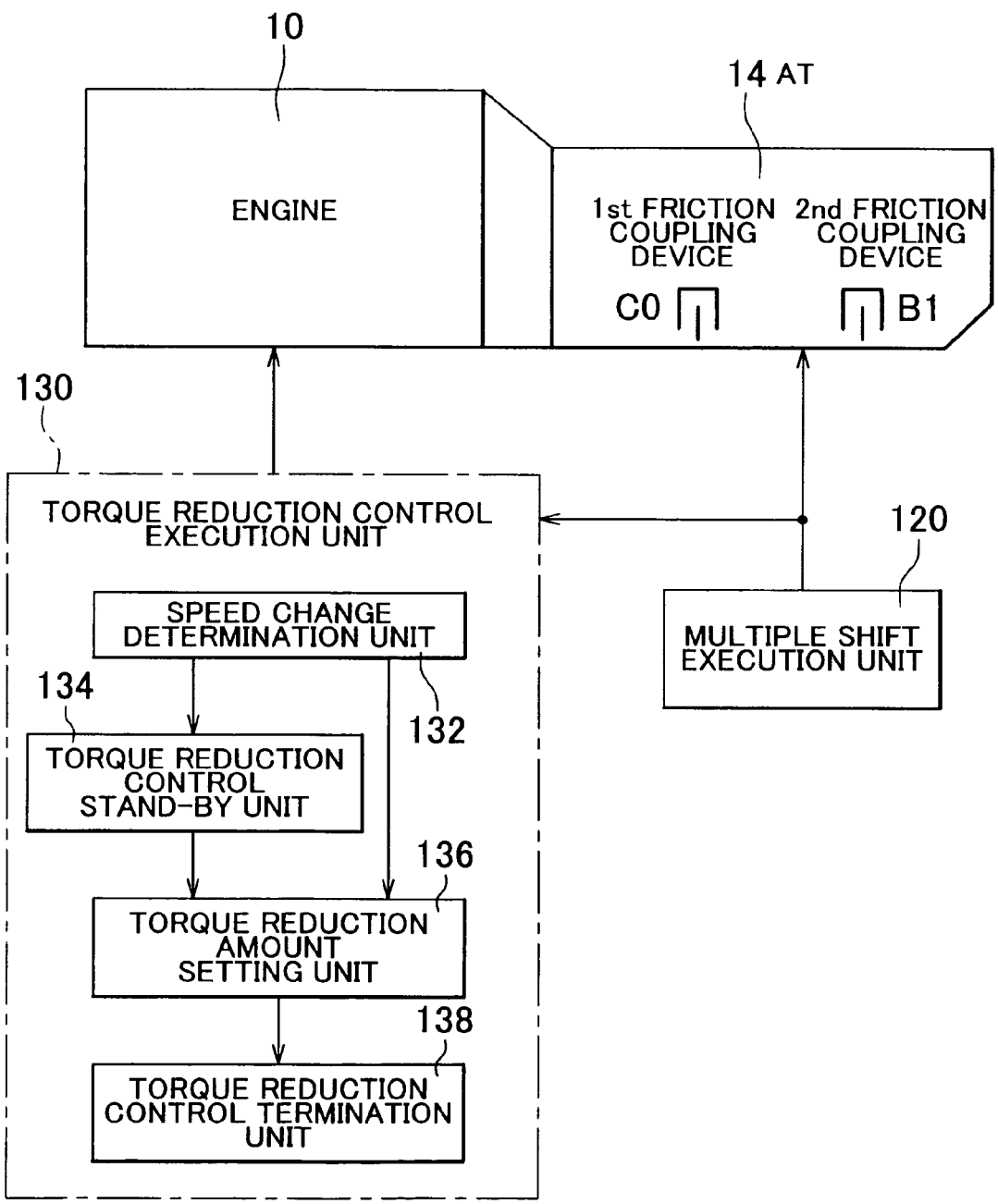
FIG. 8 is a block diagram for explaining the function performed for the 3rd to 2nd downshift in response to the 3rd to 2nd downshift determination made in the course of the 1st to 3rd upshift operation under the shift control of the automatic transmission executed by the electronic control unit shown in FIG. 3.

FIG. 8 is a block diagram representing a function for executing a multiple shift control among various control functions of the electronic control unit 90. Provided are a multiple shift execution unit 120 with respect to the shift control of the automatic transmission 14, and a torque reduction control execution unit 130 with respect to the torque reduction control of the engine 10. An upshift determination is made in accordance with the shift map shown in FIG. 6 when the accelerator pedal 50 is in the OFF state. Then the transmission upshift, in which one of the clutch C and the brake B becomes engaged, is executed in response to the upshift determination. If the accelerator pedal 50 is depressed and a downshift determination in accordance with the shift map shown in FIG. 6 is made, the multiple shift execution unit 120 immediately begins the downshift. Specifically, the multiple shift execution unit 120 begins disengaging the friction coupling device that was being engaged and starts to engage the other of the clutch C or the brake B. For example, when the downshift determination is made during the upshift operation that skips at least one stage, the downshift is performed to the skipped intermediate gear stage. More specifically, when the vehicle starts to run by initially depressing the accelerator pedal 50 to a considerably large degree, and then is released, the 1st to 3rd skip upshift operation, which engages the clutch C0, is performed in response to the 1st to 3rd skip upshift determination, is made in accordance with the shift map shown in FIG. 6. Then, if the accelerator pedal 50 is depressed again during the 1st to 3rd upshift, and the 3rd to 2nd downshift determination is made in accordance with the shift map shown in FIG. 6, the clutch C0 that was to be brought into engagement is disengaged, and the 3rd to 2nd downshift which disengages the clutch C0 that was to be brought into engagement and engages the brake B1 is performed.

Figure 9:
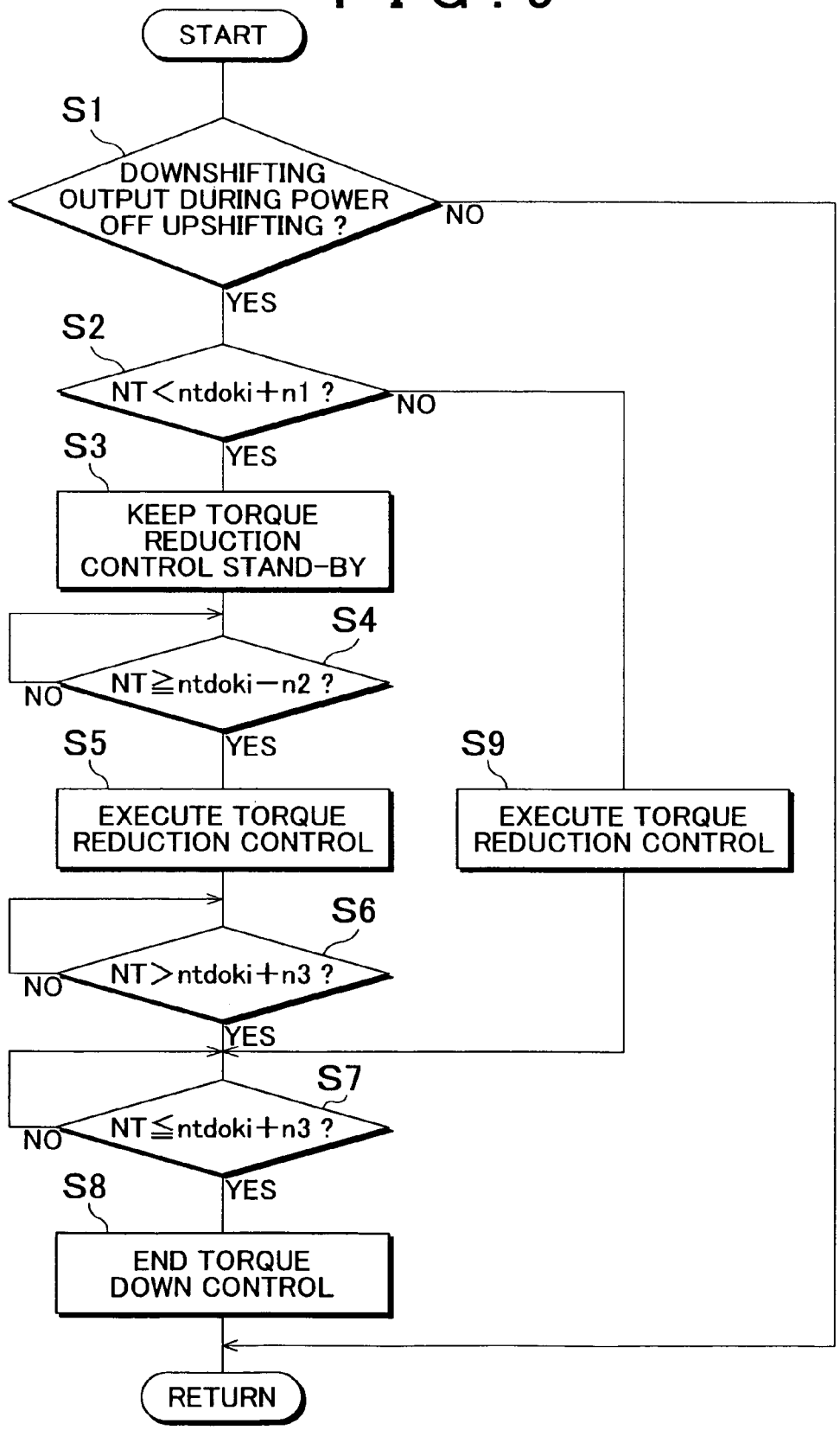
FIG. 9 is a flowchart representing the process executed by the torque reduction control execution unit shown in FIG. 8.

The torque reduction control execution unit 130, which executes the torque reduction control for temporarily decreasing the torque of the engine 10 during the multiple shift performed by the multiple shift execution unit 120, functionally includes a rotational speed change determination unit 132, a torque reduction control stand-by unit 134, a torque reduction amount setting unit 136, and a torque reduction control termination unit 138 for processing signals in accordance with a flowchart shown in FIG. 9. Step S2 of the flowchart in FIG. 9 functionally corresponds to the rotational speed change determination unit 132, steps S3 and S4 functionally correspond to the torque reduction control stand-by unit 134, steps S5 and S9 functionally correspond to the torque reduction amount setting unit 136, and steps S6 to S8 functionally correspond to the torque reduction control termination unit 138, respectively.

As shown in the flowchart in FIG. 9, in step S1, it is determined whether a downshift command output by the multiple shift execution unit 120 is made during the power OFF upshift operation, as when, for example, the multiple shift execution unit 120 outputs the command for the 3rd to 2nd downshift, which disengages the clutch C0 and engages the brake B1, in response to a 3rd to 2nd downshift determination that is made during execution of a 1st to 3rd upshift. If the command for the 3rd to 2nd downshift is output from the multiple shift execution unit 120, the process proceeds to step S2. In step S2, it is determined whether the present turbine rotational speed NT is lower than a control switch rotational speed (ntdoki+n1). The control switch rotational speed is obtained by adding a predetermined value n1 to the synchronous rotational speed ntdoki after the downshift. The synchronous rotational speed ntdoki is obtained by multiplying the present vehicle speed, that is, the output shaft rotational speed $N_{OUT}$ by the gear ratio of the gear stage established after the downshift, that is, the gear ratio of the "2nd" gear stage.

Figure 10:
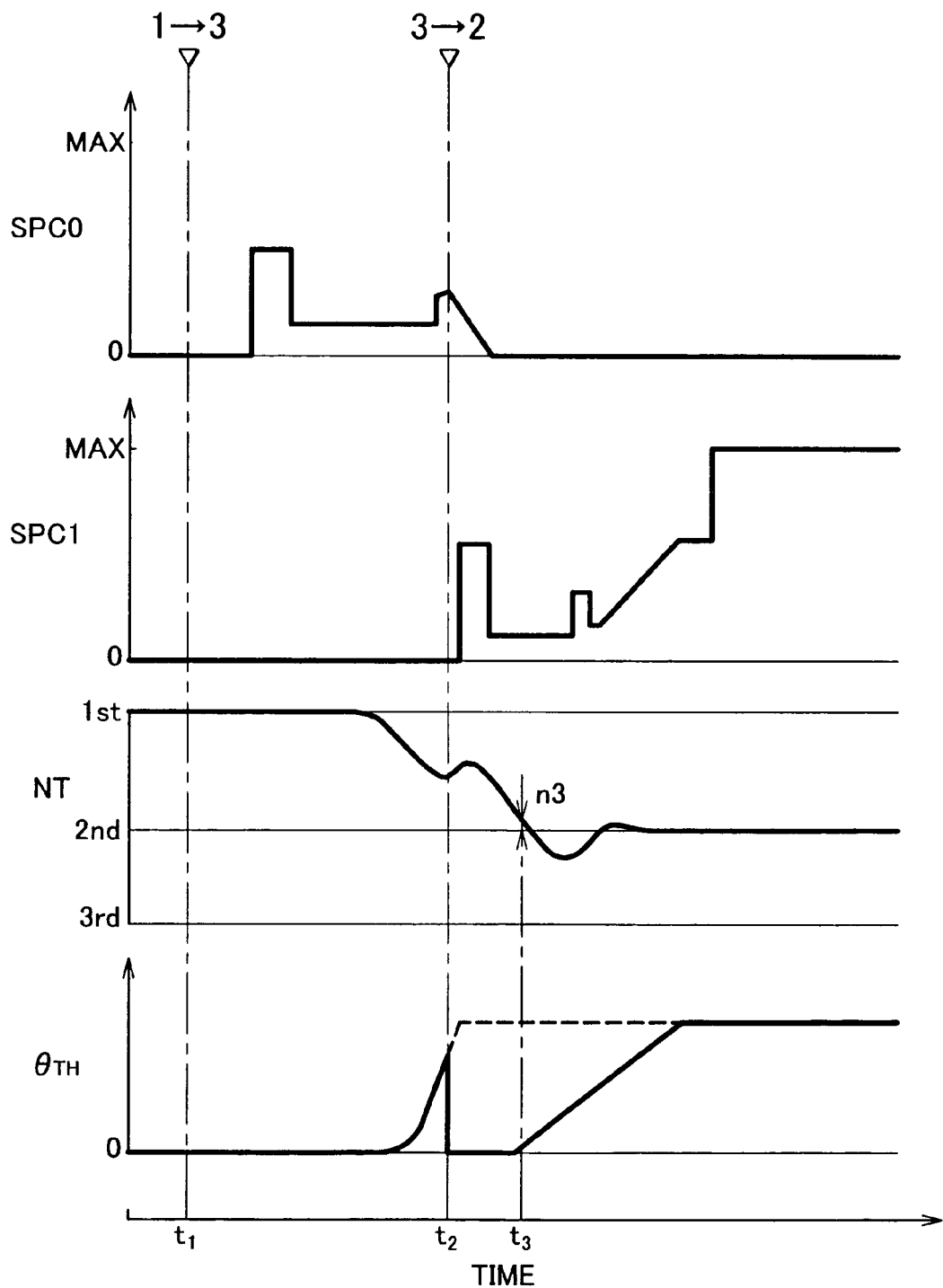
FIG. 10 is an exemplary timing chart of the torque reduction control by executing the process in step S9 and subsequent steps shown in the flowchart of FIG. 9.
Figure 11:
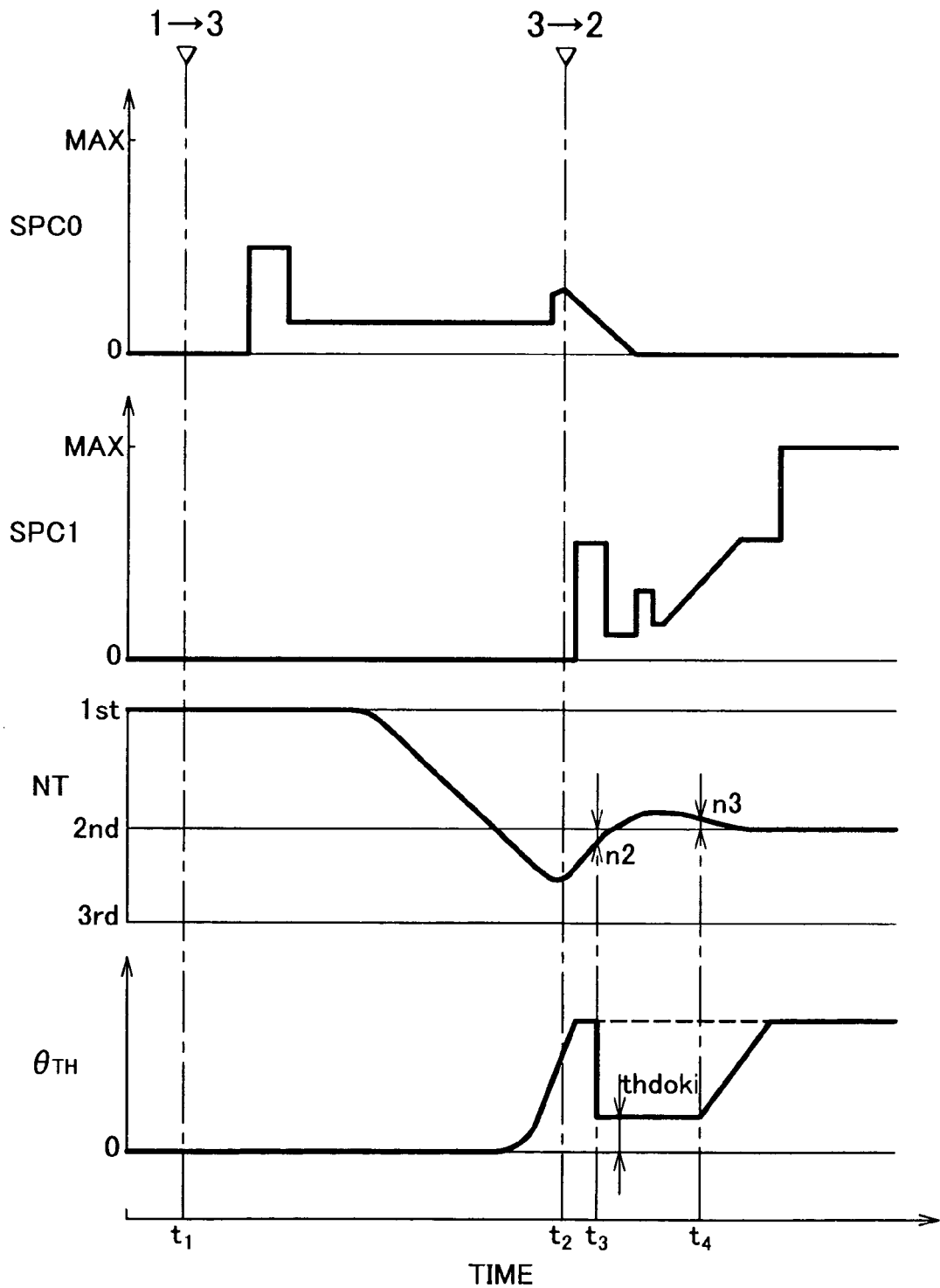
FIG. 11 is an exemplary timing chart of the torque reduction control by executing the process in step S3 and subsequent steps shown in the flowchart of FIG. 9.

In step S2, it is determined whether the turbine rotational speed NT during the 3rd to 2nd downshift is increasing or is decreasing. Basically, when the turbine rotational speed is higher than the synchronous rotational speed ntdoki after the downshift, the turbine rotational speed NT is decreasing, as shown in FIG. 10. Meanwhile, when the turbine rotational speed is lower than the synchronous rotational speed ntdoki, the turbine rotational speed NT is increasing, as shown in FIG. 11. In consideration for the error resulting from the torque response delay of the engine 10, response delay in the shift control, inertia of the engine 10, and downshift patterns, the predetermined value n1 is added to the synchronous rotational speed ntdoki to obtain the control switch rotational speed (ntdoki+n1). The turbine rotational speed is compared with the resultant control switch rotational speed. The predetermined value n1 may be set to a constant value for each downshift pattern. However, it may be calculated with a predetermined equation or a data map in which parameters such as, for example, the engine speed NE, or the AT oil temperature $T_{OIL}$ at the start of the 3rd to 2nd downshift operation (at a time point t2 shown in FIGS. 10 and 11) are set.

If YES (positive determination) is obtained in step S2, that is, the condition where NT<(ntdoki+n1) is established to represent that the turbine rotational speed NT during the downshift is increasing, the process proceeds to step S3 and subsequent steps. If NO (negative determination) is obtained in step S2, that is, the condition where NT≧(ntdoki+n1) is established to represent that the turbine rotational speed NT during the downshift is decreasing, the process proceeds to step S9. FIG. 10 shows an exemplary timing chart in the case where the turbine rotational speed NT is decreasing, that is, the process executed in step S9 and subsequent steps. FIG. 11 shows an exemplary timing chart in the case where the turbine rotational speed NT is increasing, that is, the process executed in step S3 and subsequent steps. In both cases, at time point t1, the command for the 1st to 3rd skip upshift is output when the accelerator pedal is in the OFF state, that is, at the throttle valve opening degree $\theta_{TH}=0$. At a time point t2, the command for the 3rd to 2nd downshift is output during the course of the 1st to 3rd skip upshift, in response to setting ON of the accelerator pedal. The term "SPC0", shown in FIGS. 10 and 11, refers to a drive signal for hydraulic control with respect to the linear solenoid valve SL1 that directly controls the engagement pressure $P_{C0}$ of the first friction-coupling device, in this instance, the clutch C0. The term "SPB1" refers to a drive signal for hydraulic control with respect to the linear solenoid valve SL3 that directly controls the engagement pressure $P_{B1}$ of the second friction coupling device in this instance, brake B1. The change in the actual engagement pressures $P_{C0}$ and $P_{B1}$ lag the drive signals SPC0 and SPB1, respectively. Each of those terms "1st", "2nd", and "3rd" on the vertical axis of the turbine rotational speed NT represents the synchronous rotational speed of the respective gear stages, which is obtained by multiplying the gear ratio of the gear stage by the vehicle speed, that is, the output shaft rotational speed $N_{OUT}$. If the turbine rotational speed NT matches the corresponding synchronous rotational speed, the gear stage is established. However, if the turbine rotational speed does not match the synchronous rotational speed, the gear shifting is in the middle of the shift operation.

In step S3, which is executed after a positive determination, that is, YES obtained in step S2, the torque reduction control remains in a standby state. In step S4, it is determined whether the turbine rotational speed NT has increased to be equal to or higher than the control start-up rotational speed (ntdoki−n2) obtained by subtracting a predetermined value n2 from the synchronous rotational speed after the downshift. When the condition where NT≧(ntdoki−n2) is established, the process proceeds to step S5 where the torque reduction control is executed. In the case where the turbine rotational speed NT is lower than the control switch rotational speed (ntdoki+n1), the turbine rotational speed must be increased to the synchronous rotational speed ntdoki when downshifting from $3^{rd}$ to $2^{nd}$. Therefore, the torque reduction control is not executed immediately, but maintained in a stand-by state until the turbine rotational speed NT reaches at least the predetermined control start-up rotational speed (ntdoki−n2).

The control start-up rotational speed (ntdoki−n2) represents the rotational speed at which the torque reduction control is started. The predetermined value n2 may be empirically determined in consideration for the torque response delay, inertia of the engine 10, the opening degree "thdoki" of the electronic throttle valve 56 during closing operation under the torque reduction control in step S5 so as to increase the turbine rotational speed NT quickly and to promote the smooth downshift while preventing overspeeding of the engine 10 or shift shock. The predetermined value n2 may be set to a constant value for each downshift pattern. However, it may be calculated using a predetermined equation or a data map in which the engine speed NE, the AT oil temperature $T_{OIL}$, and the like, at the start of the 3rd to 2nd downshift operation set as parameters. At the time point t3 shown in FIG. 11, the torque reduction control starts in step S5 after the positive determination, that is, YES obtained in step S4 as the turbine rotational speed NT is increased to be equal to or higher than the control start-up rotational speed (ntdoki−n2).

The torque reduction control in step S5 is executed by reducing the throttle valve opening degree $\theta_{TH}$ to the value "thdoki" at which the engine 10 only outputs sufficient torque to increase the turbine rotational speed NT to the synchronous rotational speed ntdoki after the downshift. Under the torque reduction control, the rate of the increase in the turbine rotational speed NT is suppressed to prevent the overspeeding the engine 10 and to decrease the shift shock. The aforementioned opening degree "thdoki" under the closing control is determined empirically in consideration of the torque response delay, inertia of the engine 10, and the predetermined value n2 in step S4 so as to make sure that the turbine rotational speed NT exceeds the synchronous rotational speed ntdoki. The opening degree "thdoki" under the closing control may be set to a constant value for each downshift pattern. However, it may be calculated with a predetermined equation or a data map in which parameters such as, for example, the engine speed NE or the AT oil temperature $T_{OIL}$ and the like, when starting the 3rd to 2nd downshift, are set as parameters.

In step S6, it is determined whether the turbine rotational speed NT exceeds a torque reduction control termination rotational speed (ntdoki+n3), which is obtained by adding a predetermined value n3 to the synchronous rotational speed ntdoki after the downshift. If the condition where NT>(ntdoki+n3) is established, the process proceeds to step S7. In step S7, it is determined whether the turbine rotational speed NT is decreased through engagement of the brake B1, during the 3rd to 2nd downshift, to be equal to or lower than the torque reduction control termination rotational speed (ntdoki+n3). If the condition where NT<(ntdoki+n3) is established, the process proceeds to step S8. In step S8 the throttle valve opening degree $\theta_{TH}$ is increased to a throttle valve opening degree $\theta_{TH}$ corresponding to the current accelerator pedal operation amount Acc at a predetermined increase rate. The torque reduction control termination rotational speed (ntdoki+n3) is set for allowing the engine 10 to quickly generate the torque upon completion of the 3rd to 2nd downshift while preventing overspeeding of the engine 10 caused by ending the torque reduction control. The torque reduction control termination rotational speed corresponds to the first return rotational speed. The predetermined value n3 may be empirically determined in consideration for the torque response delay, and inertia of the engine 10. The predetermined value n3 may be set to a constant value for each downshift pattern. However, it may be calculated with a predetermined equation or a data map in which parameters such as, for example, the engine speed NE, or the AT oil temperature $T_{OIL}$, and the like, when starting the 3rd to 2nd downshift operation, are set. At the time point t4 shown in FIG. 11, the torque reduction control ends when the positive determination, that is, YES obtained in step S7 as the turbine rotational speed NT is decreased to the value equal to or lower than the torque reduction control termination rotational speed (ntdoki+n3). The broken line at the section of the throttle valve opening degree $\theta_{TH}$ represents the throttle valve opening degree $\theta_{TH}$ corresponding to the accelerator pedal operation amount Acc.

If NO (negative determination) is obtained in step S2, that is, the condition where NT≧(ntdoki+n1) is established, the process proceeds to step S9 where the torque reduction control is executed by bringing the throttle valve opening degree $\theta_{TH}$ into the fully closed state. In the case where the turbine rotational speed NT is equal to or higher than the control switch rotational speed (ntdoki+n1), the turbine rotational speed NT must be increased to the synchronous rotational speed ntdoki during downshifting from $3^{rd}$ to $2^{nd}$. The torque reduction control is, thus, immediately started to bring the throttle valve opening degree $\theta_{TH}$ into the fully closed state.

Thereafter, the process proceeds to step S7 and subsequent steps. When the turbine rotational speed NT is decreased to be equal to or lower than the torque reduction control termination rotational speed (ntdoki+n3), the torque reduction control ends in step S8. At the time point t3 shown in FIG. 10, the torque reduction control ends in step S8 when the positive determination, that is, YES obtained in step S7 as the turbine rotational speed NT is decreased to be equal to or lower than the torque reduction control termination rotational speed (ntdoki+n3). The broken line at the section of the throttle valve opening degree $\theta_{TH}$ represents the throttle valve opening degree $\theta_{TH}$ corresponding to the accelerator pedal operation amount Acc. The torque reduction control termination rotational speed (ntdoki+n3) corresponds to the second torque reduction control termination rotational speed, which is equal to the first torque reduction control termination rotational speed in the embodiment. In this case, as the throttle valve opening degree $\theta_{TH}$ is brought into the fully closed state, the torque reduction control ends in step S8 may be executed at a time point when the turbine rotational speed NT is decreased to be equal to or lower than the second torque reduction control termination rotational speed (ntdoki+n4), which is obtained by adding a predetermined value n4 larger than the predetermined value n3 to the synchronous rotational speed ntdoki.

In the shift control apparatus according to the embodiment of the invention, in response to the 3rd to 2nd downshift determination made during the 1st to 3rd upshift operation, the downshift is immediately started. It is determined whether the turbine rotational speed NT when starting the downshift (at a time point t2) is equal to or higher than the control switch rotational speed (ntdoki+n1) set in accordance with the synchronous rotational speed ntdoki after the downshift so as to determine the rotational speed change of the turbine rotational speed during downshift, that is, to determine whether the turbine rotational speed is increasing or decreasing. The manner in which torque reduction control is executed will depend on the above-described determination result. The torque reduction control may be always executed appropriately so as to obtain the desired driving force by smoothly performing the 3rd to 2nd downshift while preventing overspeeding of the engine 10 or shift shock irrespective of the difference in the rotational speed change of the turbine rotational speed NT during the downshift.

In the case where the turbine rotational speed NT when starting the downshift is lower than the control switch rotational speed (ntdoki+n1), that is, the turbine rotational speed NT must be increased to the synchronous rotational speed ntdoki during the 3rd to 2nd downshift, the process is executed in step S3 such that the torque reduction control is started after an elapse of time until the turbine rotational speed NT is increased to be equal to or higher than the control start-up rotational speed (ntdoki−n2) rather than being immediately started. In this case, the torque of the engine 10 allows the turbine rotational speed NT to be increased smoothly, and the downshift to be quickly performed under the torque reduction control while preventing the over revolution of the engine 10, thus readily obtaining the desired driving force.

The torque reduction control is executed by reducing the throttle valve opening degree $\theta_{TH}$ of the engine 10 to the value "thdoki" at which the engine 10 outputs torque that is just sufficient to increases the turbine rotational speed NT to the synchronous rotational speed ntdoki after the downshift. Accordingly the engine torque allows the turbine rotational speed NT to be increased to the synchronous rotational speed ntdoki more quickly while preventing the over revolution of the engine 10, resulting in the excellent shift response.

The torque reduction control ends when the turbine rotational speed NT exceeds the predetermined torque reduction control termination rotational speed (ntdoki+n3), and then decreases to be equal to or lower than the torque reduction control termination rotational speed (ntdoki+n3). This makes it possible to readily start generating the torque upon completion of the downshift while preventing the over revolution of the engine 10 caused by ending the torque reduction control.

Meanwhile, in the case where the turbine rotational speed NT when starting the downshift is equal to or higher than the control switch rotational speed (ntdoki+n1), that is, the turbine rotational speed NT must be decreased to the synchronous rotational speed ntdoki during downshifting from $3^{rd}$ to $2^{nd}$, the process proceeds to step S9 and subsequent steps. In step S9, the torque reduction control is immediately started to fully close the throttle valve opening degree $\theta_{TH}$. When the turbine rotational speed NT is decreased to be equal to or lower than the return rotational speed (ntdoki+n3), the downshift is quickly performed to start the process for ending the torque reduction control while preventing the over revolution of the engine 10. This makes it possible to readily start generating the torque upon completion of the downshift, thus obtaining the desired driving force.

In the embodiment of the invention, in the case where the turbine rotational speed NT when starting the downshift is lower than the control switch rotational speed (ntdoki+n1) obtained by adding the predetermined value n1 to the synchronous rotational speed ntdoki, it is determined that the turbine rotational speed NT during the downshift is increasing. When the turbine rotational speed NT is equal to or higher than the control switch rotational speed (ntdoki+n1), it is determined that the turbine rotational speed is decreasing. This makes it possible to determine the rotational speed change of the turbine rotational speed NT simply and quickly.

The embodiment of the invention has been described referring to the drawings. It is to be understood that the invention is not limited to the embodiment as described above, and may be performed in the form modified or improved based on the knowledge of those who skilled in the art.

What is claimed is:

1. A shift control apparatus that executes a shift control of an automatic transmission that changes a speed of a rotation transferred from a power source to an input member and outputs the rotation to a drive wheel, wherein, in response to a downshift determination made during an upshift operation which engages a first friction coupling device, the shift control apparatus performs a downshift operation which disengages the first friction coupling device and engages a second friction coupling device, the shift control apparatus comprising:
    a multiple shift execution unit that starts the downshift operation in response to the downshift determination; and
    a torque reduction control execution unit that:
    determines, after starting the downshift operation, whether a rotational speed of the input member has increased to be equal to or higher than a control start-up rotational speed that is preliminarily set to be lower than a synchronous rotational speed, which is determined in accordance with a shift ratio of a gear stage to be established by the downshift operation; and
    executes a torque reduction control that reduces a torque output of the power source when the rotational speed of the input member increases to be equal to or higher than the control start-up rotational speed.

2. The shift control apparatus according to claim 1, wherein:
    the power source comprises an internal combustion engine with an electronically controlled throttle valve; and
    the torque reduction control execution unit executes a control to reduce the opening degree of the throttle valve to a value at which the internal combustion engine outputs sufficient torque to increase the rotational speed of the input member to the synchronous rotational speed.

3. The shift control apparatus according to claim 1, wherein the torque reduction control execution unit ends the torque reduction control when the rotational speed of the input member exceeds a predetermined torque reduction control termination rotational speed, which is higher than the synchronous rotational speed, and then decreases to be equal to or lower than the torque reduction control termination rotational speed.

4. The shift control apparatus according to claim 1, wherein the torque reduction control execution unit includes a speed change determination unit that determines whether the rotational speed of the input member is increasing or is decreasing during the downshift operation by comparing the rotational speed of the input member at the start of the downshift operation with a value based on the synchronous rotational speed, wherein the manner in which the torque reduction control is executed is set in accordance with whether the rotation speed of the input member is determined to be increasing or decreasing.

5. The shift control apparatus according to claim 4, wherein, when the rotational speed of the input member at the start of the downshift operation is lower than a control switch rotational speed that is set based on the synchronous rotational speed, the speed change determination unit determines that the rotational speed is increasing, and when the rotational speed of the input member is equal to or higher than the control switch rotational speed, the speed change determination unit determines that the rotational speed is decreasing.

6. The shift control apparatus according to claim 4, wherein the multiple shift execution unit executes the torque reduction control when the rotational speed of the input member is increased to be equal to or higher than the control start-up rotational speed when the speed change determination unit determines that the rotational speed is increasing, and executes the torque reduction control immediately when the speed change determination unit determines that the rotational speed is decreasing.

7. The shift control apparatus according to claim 4, wherein:
    the power source comprises the internal combustion engine with an electronically controlled throttle valve; and
    the torque reduction control execution unit executes a control to reduce the opening degree of the throttle valve to a value at which the engine outputs sufficient torque to increase the rotational speed of the input member to the synchronous rotational speed when the speed change determination unit determines that the rotational speed is increasing, and executes a control to fully close the throttle valve when the speed change determination unit determines that the rotational speed is decreasing.

8. The shift control apparatus according to claim 4, wherein the torque reduction control execution unit ends the torque reduction control when the rotational speed of the input member exceeds a predetermined first return rotational speed higher than the synchronous rotational speed, and then decreases to be equal to or lower than the first return rotational speed when the speed change determination unit determines that the rotational speed is increasing, and ends the torque reduction control when the rotational speed of the input member decreases to be equal to or lower than a predetermined second return rotational speed higher than the synchronous rotating speed when the speed change determination unit determines that the rotational speed is decreasing.

9. A method of controlling an automatic transmission, which changes a speed of a rotation transferred from a power source to an input member and outputs the rotation to a drive wheel, wherein, in response to a downshift determination made during an upshift operation that engages a first friction coupling device, a downshift operation, which disengages the first friction coupling device and engages a second friction coupling device, is performed; the method comprising:

starting the downshift operation in response to the downshift determination;

determining, after starting the downshift operation, whether a rotational speed of an input member has increased to be equal to or higher than a control start-up rotational speed that is preliminarily set to be lower than a synchronous rotational speed, which is determined in accordance with a shift ratio of a gear stage to be established by the downshift operation; and executing a torque reduction control to reduce a torque output of the power source when the rotational speed of the input member increases to be equal to or higher than the control start-up rotational speed.

10. The method according to claim 9, wherein:

the power source comprises an internal combustion engine with an electronically controlled throttle valve; and the torque reduction control reduces the opening degree of the throttle valve to a value at which the internal combustion engine outputs sufficient torque to increase the rotational speed of the input member to the synchronous rotational speed.

11. The method according to claim 9, wherein the torque reduction control ends when the rotational speed of the input member exceeds a predetermined torque reduction control termination rotational speed, which is higher than the synchronous rotational speed, and then decreases to be equal to or lower than the torque reduction control termination rotational speed.

12. The method according to claim 9, further comprising determining whether the rotational speed of the input member is increasing or is decreasing during the downshift operation by comparing the rotational speed of the input member at the start of the downshift operation with a value based on the synchronous rotational speed, and executing the torque reduction control in accordance with whether the rotational speed of the input member is determined to be increasing or decreasing.

13. The method according to claim 12, wherein, it is determined that the rotational speed is increasing when the rotational speed of the input member at the start of the downshift operation is lower than a control switch rotational speed that is set based on the synchronous rotational speed, and it is determined that the rotational speed is decreasing if the rotational speed of the input member is equal to or higher than the control switch rotational speed.

14. The method according to claim 12, wherein the torque reduction control is executed when the rotational speed of the input member is increased to be equal to or higher than the control start-up rotational speed when it is determined that the rotational speed is increasing, and the torque reduction control is executed immediately when it is determined that the rotational speed is decreasing.

15. The method according to claim 12, wherein:

the power source comprises an internal combustion engine with an electronically controlled throttle valve; and the torque reduction control reduces the opening degree of the throttle valve to a value at which the internal combustion engine output sufficient torque to increase the rotational speed of the input member to the synchronous rotational speed when it is determined that the rotational speed is increasing, and executes a control to fully close the throttle valve when it is determined that the rotational speed is decreasing.

16. The method according to claim 12, wherein the torque reduction control ends when the rotational speed of the input member exceeds a predetermined first return rotational speed that is higher than the synchronous rotational speed, and then decreases to be equal to or lower than the first return rotational speed when it is determined that the rotational speed is increasing, and the torque reduction control ends when the rotational speed of the input member decreases to be equal to or lower than a predetermined second return rotational speed higher than the synchronous rotating speed when it is determined that the rotational speed is decreasing.

* * * * *